(12) United States Patent
Heber et al.

(10) Patent No.: US 12,287,506 B2
(45) Date of Patent: Apr. 29, 2025

(54) LIGHTING DEVICE FOR A FREE VIEWING MODE AND A RESTRICTED VIEWING MODE

(71) Applicant: siOPTICA GmbH, Jena (DE)

(72) Inventors: André Heber, Weimar (DE); Markus Klippstein, Jena (DE)

(73) Assignee: siOPTICA GmbH, Jena (DE)

( * ) Notice: Subject to any disclaimer, the term of this patent is extended or adjusted under 35 U.S.C. 154(b) by 0 days.

(21) Appl. No.: 18/553,521

(22) PCT Filed: Mar. 29, 2022

(86) PCT No.: PCT/EP2022/058264
§ 371 (c)(1),
(2) Date: Sep. 29, 2023

(87) PCT Pub. No.: WO2022/207639
PCT Pub. Date: Oct. 6, 2022

(65) Prior Publication Data
US 2024/0192428 A1 Jun. 13, 2024

(30) Foreign Application Priority Data
Mar. 30, 2021 (DE) .................. 10 2021 108 112.2

(51) Int. Cl.
*F21V 8/00* (2006.01)
(52) U.S. Cl.
CPC ......... *G02B 6/0036* (2013.01); *G02B 6/0068* (2013.01)

(58) Field of Classification Search
CPC ........................... G02B 6/0036; G02B 6/0068
See application file for complete search history.

(56) References Cited

U.S. PATENT DOCUMENTS

| | | |
|---|---|---|
| 5,956,107 A | 9/1999 | Hashimoto et al. |
| 2006/0181903 A1 | 8/2006 | Okuwaki |

(Continued)

FOREIGN PATENT DOCUMENTS

| | | |
|---|---|---|
| CN | 1987606 A | 6/2007 |
| CN | 107734118 A | 2/2018 |

(Continued)

*Primary Examiner* — Evan P Dzierzynski
*Assistant Examiner* — Jessica M Apenteng
(74) *Attorney, Agent, or Firm* — Christensen, Fonder, Dardi & Herbert PLLC

(57) ABSTRACT

An illumination device for a display screen operable in an open-viewing mode B1 and a restricted-viewing mode B2 where light is emitted in a limited angular range. It includes a backlight emitting the limited-angular-range light, a plate-shaped light guide with large surfaces and narrow connecting sides in front of the backlight in a viewing direction. The light guide has outcoupling elements on the surfaces or within its volume, and is at least 50% transparent to backlight light. Outcoupling elements have a function surface for coupling out light guide light. Illuminants are arranged laterally of the narrow sides. The backlight is on and the illuminants off in mode B2, and the illuminants are on in mode B1. Some outcoupling elements have a structure causing scattering in a preferential direction that is stronger by a factor of at least 1.2 than in a direction perpendicular to the preferential direction, yielding anisotropic scattering.

6 Claims, 4 Drawing Sheets

(56) References Cited

U.S. PATENT DOCUMENTS

| | | |
|---|---|---|
| 2007/0008456 A1 | 1/2007 | Lesage et al. |
| 2007/0030240 A1 | 2/2007 | Sumiyoshi et al. |
| 2012/0235891 A1 | 9/2012 | Nishitani et al. |
| 2017/0069236 A1 | 3/2017 | Klippstein et al. |
| 2017/0261672 A1 | 9/2017 | Liu et al. |
| 2018/0267344 A1 | 9/2018 | Wu |
| 2018/0335655 A1 | 11/2018 | Alkhimenko et al. |
| 2019/0353838 A1 | 11/2019 | Heber et al. |
| 2020/0012129 A1 | 1/2020 | Wu |

FOREIGN PATENT DOCUMENTS

| | | | |
|---|---|---|---|
| CN | 108983447 A | * 12/2018 | ........... G02B 6/0035 |
| DE | 10 2006 003 134 A1 | 9/2006 | |
| DE | 11 2010 004 660 T5 | 10/2012 | |
| DE | 10 2019 115 530 A1 | 12/2020 | |
| DE | 10 2020 002 513 B3 | 7/2021 | |
| JP | H10-097199 A | 4/1998 | |
| JP | 2007-280635 A | 10/2007 | |
| JP | 2020-004610 A | 1/2020 | |
| JP | 2020-525972 A | 8/2020 | |
| WO | WO 2015/121398 A1 | 8/2015 | |
| WO | WO 2017/065745 A1 | 4/2017 | |
| WO | WO 2017/089482 A1 | 6/2017 | |

\* cited by examiner

LIGHTING DEVICE FOR A FREE VIEWING MODE AND A RESTRICTED VIEWING MODE

PRIORITY CLAIM

The present application is a National Phase entry of PCT Application No. PCT/EP2022/058264, filed Mar. 29, 2022, which claims priority from German Patent Application No. 10 2021 108 112.2, filed Mar. 30, 2021, the disclosures of which are hereby incorporated by reference herein in their entirety.

FIELD OF THE INVENTION

In recent years, great strides have been made in widening the visual angle in LCDs. However, there are often situations in which this very large viewing area of a display screen can be disadvantageous. Increasingly, information such as bank data or other personal information and sensitive data is also available on mobile devices, such as notebooks and tablets. Accordingly, people need to supervise viewing access to these sensitive data. They must be able to choose between a wide viewing angle for sharing information on their display with others, e.g., when viewing vacation photographs or for advertising purposes. On the other hand, they need a small viewing angle when they want to treat the displayed information confidentially.

A similar problem arises in automotive engineering. In this case, the driver must not be distracted by image contents, e.g., digital entertainment programs, when the engine is running, but the front seat passenger wants to enjoy such images also during driving. Consequently, there is a need for a display screen which can switch between the corresponding display modes.

Add-on films based on microlouvers have already been used for mobile displays in order to achieve protection of visual data. However, these films were not switchable; they always had to be manually applied first and then removed again subsequently. They also had to be carried separately from the display when not in use at a particular time. A further substantial drawback in the use of such louvered films is connected to the light losses entailed.

BACKGROUND OF THE INVENTION

U.S. Pat. No. 5,956,107 A discloses a switchable light source with which a display screen can be operated in a plurality of modes. The disadvantage herein consists in that all of the outcoupling of light is based on scattering and therefore only low efficiency and sub-optimal light direction effects are achieved. In particular, the achievement of a focused light cone is not disclosed more fully.

CN 107734118 A describes a display screen which controllably configures the viewing angle of a display screen by means of two backlights. The upper backlight of the two backlights is supposed to emit focused light for this purpose. In particular, a grating with opaque and transparent portions is mentioned as configuration. However, as a result of this same grating, the light of the second backlight which must penetrate the first backlight in direction of an LCD panel is presumably also focused and, consequently, the public viewing mode which is actually provided for a wide viewing angle suffers from an appreciably reduced angle.

US 2007/030240 A1 describes an optical element for controlling the light propagation direction of light coming from a backlight. This optical element requires, for example, liquid crystals in the form of PDLCs, which are expensive on the one hand but safety-critical on the other hand particularly for end consumer applications, since switching of PDLC liquid crystals generally requires voltages higher than 60V.

CN 1987606 A describes a display screen which, again, controllably configures the viewing angle of a display screen by means of two backlights. In particular, a "first light plate" is used which must be wedge-shaped in order to permit the intended focused outcoupling of light. Exact details about achieving the focused outcoupling of light with corresponding angular conditions are not disclosed.

Further, US 2018/0267344 A1 describes a construction with two flat illumination modules. In this case, the light of the illumination module located in the rear in viewing direction is focused through a separate structure. After focusing, the light must still pass the front illumination module which has scattering elements. Therefore, a strong focusing of light cannot be realized in an optimal manner for a protected view.

Finally, US 2007/0008456 A1 discloses splitting a light emission angle into at least three regions, two of which regions are generally acted upon by light. As a result of this, a protected view in which a display illuminated in this manner is used cannot be viewable solely from one direction.

WO 2015/121398 A1 by the present applicant describes a display screen of the type described above. In this case, essentially scattering particles are present in the volume of the corresponding light guide for toggling between operating modes. However, the scattering particles selected therein which comprise a polymerizate generally have the disadvantage that light is coupled out of both large areas so that about one half of the useful light is emitted in the wrong direction, namely, toward the backlight, and cannot be recycled there to a sufficient extent because of the construction. Beyond this, the scattering particles of polymerizate which are distributed in the volume of the light guide can lead to scattering effects under certain circumstances, particularly at higher concentrations, and these scattering effects reduce the viewing privacy effect in the protected operating mode.

US 2020/012129 A1 discloses an illumination device and a display screen which describe two lights for switching between a narrow viewing mode and a wide viewing mode. On the one hand, one of the light guides is formed with fibers. On the other hand, the scattering outcoupling structure of a light guide is limited to determined strips in projection direction. This is disadvantageous for a homogeneous image illumination and generally also causes unwanted moiré effects in the construction, such as in the interplay with the pixel columns or pixel lines of an LCD panel located above the latter.

The methods and arrangements cited above generally share the disadvantage that they appreciably reduce the brightness of the basic display screen and/or require an active—but at least a special—optical element for mode switching and/or a complicated and expensive production and/or reduce the resolution in the freely viewable mode.

SUMMARY OF THE INVENTION

Therefore, it is an object of the invention to describe an illumination device by means of which, in combination with a display screen, information can be securely displayed by means of a selectively limited viewing angle and, in a further operating mode, an open view which is as unrestricted as possible with respect to the viewing angle shall be possible. The invention shall be realizable as economically as possible with simple means. A resolution which is as high as possible, particularly preferably the native resolution of the utilized display screen, shall be viewable in both operating modes. Further, as a result of the solution, merely the smallest possible light loss shall be incurred and the restricted viewing angle shall achieve a protected viewing effect which is as comprehensive as possible.

According to the invention, the above-stated problem is solved by an illumination device for a display screen, which illumination device can be operated in at least two operating modes, B1 for an open viewing mode, and B2 for a restricted viewing mode in which light is emitted by the illumination device in an angular range which is limited compared with the open viewing mode. The illumination device comprises a two-dimensionally extending backlight which emits light in the limited angular range and a plate-shaped light guide with two large surfaces and narrow sides connecting the large surfaces at the edges thereof which is located in front of the backlight in viewing direction. The light guide has outcoupling elements on at least one of the large surfaces and/or within its volume and is at least 50%, but preferably at least 70%, transparent to light emanating from the backlight. Illuminants are arranged laterally of the narrow sides of the light guide, it being subsumed thereunder also that illuminants are arranged only on one side of the light guide. In operating mode B2, the backlight is switched on and the illuminants are switched off, whereas in operating mode B1 at least the illuminants are switched on. The shape, quantity per surface area, orientation and/or extent of the outcoupling elements are selected in such a way that by means of the outcoupling elements or at least a proportion thereof—the light guide has an anisotropic scattering behavior for light which penetrates the light guide through the large surfaces thereof.

In concrete terms, this means that every outcoupling element has at least one function surface for coupling out light in a defined manner at which light is correspondingly coupled out of the light guide. In the simplest case, these function surfaces are planar or at least have planar surface portions, but they may also be surfaces which are curved in one or two linearly independent directions. An orientation vector is now defined for the function surfaces, this orientation vector being parallel to the large surface at which the light exits, i.e., in a plane parallel to the aforementioned large surface. This orientation vector is a vector which maximizes the integral of the scalar product of this vector with a spatially dependent normal vector of the function surface over the function surface. For planar surfaces, of course, the normal vector is constant at every point on the function surface but varies for curved surfaces in case of the normal vector of a tangential plane at the respective point.

Specifically, the orientation vector $\vec{v}$ maximizes the integral $\int_A \vec{n} \cdot \vec{v} \, dA$, where $\vec{n}$ is the spatially dependent normal vector of the function surface A in coordinates x and y. This orientation vector forms an angle of up to 45° with a given preferential direction. The normal vector forms an angle of between a minimum of 5° and a maximum of 85° with the respective large surface from which the light exits, but, preferably, the lower limit value is 30° and/or the upper limit value is 60°.

When the outcoupling elements are configured in this manner, the light guide has a scattering behavior in the preferential direction that is stronger by a factor of at least 1.2 than in a direction perpendicular to the preferential direction and, therefore, has an anisotropic scattering behavior overall for light which penetrates the light guide through both large surfaces.

In principle, any area that is smaller than the half space in front of the backlight can be contemplated as limited angular range. Preferably, however, e.g., an angular range of +/−20° or 30° horizontally and/or vertically or as a cone around the surface normal or a selectable direction vector on the backlight is meant. Small amounts of light of less than 1% to 5% of maximum brightness may be left out of consideration in defining the limited angular range.

The illumination device may additionally comprise a collimation film at a suitable location in the construction, for example, a lenticular screen or prism raster above or below the plate-shaped light guide.

The relevant proportion of the outcoupling elements advantageously comprises at least 30% of all of the outcoupling elements, preferably at least 50%, 70% or 90% of all of the outcoupling elements. Additionally or alternatively, for all of the outcoupling elements on the average, the orientation vectors form an angle of up to 45°, i.e., angles between −45° and +45°, with the preferential direction.

The light guide preferably has a stronger scattering behavior in the preferential direction than in the opposite direction. This is achieved by means of correspondingly asymmetrically shaped outcoupling elements. More precisely, the cross section of the outcoupling elements should be asymmetrical in a section plane parallel to the preferential direction provided the scattering behavior without outcoupling elements is the same in the preferential direction and perpendicular thereto. In case stronger scattering behavior is realized in preferential direction in other ways, outcoupling elements with symmetrical cross section can also be used. An asymmetrical cross section in preferential direction is also a precondition for achieving a different scattering behavior in preferential direction and opposite thereto.

The anisotropic scattering behavior of the outcoupling elements is characterized based on the measurement of the scattering behavior with respect to at least two directions running perpendicular to one another along which the scattering behavior is measured, a preferential direction and a direction perpendicular thereto. In this respect, the scattering behavior to be contemplated is that which is brought about when light passes through a light guide perpendicularly because of the outcoupling elements.

The preferential direction advantageously corresponds to the vertical direction from the perspective of an observer viewing the illumination device, so that the scattering behavior of the light guide is greater in vertical direction than in horizontal direction. The terms "vertical" and "horizontal" refer broadly to two directions perpendicular to one another on the surface of the backlight or on a large surface of a light guide which, during operation, depending on the orientation of the display screen which is used with the illumination device and which is generally fixed, correspond to a direction that is actually horizontal or vertical with respect to the position of an observer and, therefore, the Earth's surface. Generally, the horizontal direction then extends parallel to the line connecting the eyes of an observer, i.e., is ultimately a matter of the orientation of the observer in space.

Particularly preferably, the ratio of the areas of the function surfaces of the aforementioned proportion of outcoupling element to the area of a large surface is determined in such a way that the scattering behavior of the outcoupling elements in the preferential direction is greater than in the direction perpendicular to the preferential direction by a factor of at least 2 or 3. However, this anisotropy may vary over the surface area of the plate-shaped light guide. The anisotropy is typically higher at locations where the density of the outcoupling elements is high than at locations where the density is low. The large surface from which the light exits is divided into subregions of predetermined size. The ratio of the area of function surfaces in a subregion to the area of the respective subregion varies for different subregions so that the scattering behavior of the light guide varies over the large surface from which the light exits.

In a preferred embodiment of the illumination device, the light emitted by the backlight at least in operating mode B2 is emitted in horizontal direction in a limited angular range such that the aforementioned light undergoes less scattering when passing through the light guide in horizontal direction than in vertical direction. In this way, light which is emitted in the limited angular range is typically scattered at most slightly outside of the aforementioned limited angular range, which is beneficial for the protected view effect. This is a substantial advantage of the invention.

By "slightly" is meant, for example, that—because of the minimal scattering behavior—at an angle of, for example, 40° horizontal from the surface normal or another given direction, measured along the horizontal direction, the luminance emitted by the illumination device at an angle of 0° includes a maximum 3% through scattering due to the light guide. In another configuration which can be combined with the first configuration, "slightly" means that in a solid angle range of +/−200 in the preferential direction and +/−10° in the direction perpendicular to the preferential direction, less than 10% of the light is scattered. The haze value should also preferably be less than 15%.

However, the case may be exactly the opposite: in case the focusing of the light proceeding from the backlight is too strong in a horizontal limited angular range, a stronger scattering behavior in the horizontal direction (compared to the vertical direction) by deliberately spreading out the light may be helpful. Moreover, the anisotropic scattering behavior of at least a proportion of (or all of) the outcoupling elements may be helpful in order to visible overlaps (e.g., moiré effects) which may occur through the interplay of the components of the illumination device with one another and/or with a display screen.

The bidirectional transmittance distribution function (BTDF) is used to quantify the scattering behavior along two preferential axes. The BTDF quantifies how light is transmitted under a determined incident angle ($H_i$, $V_i$). All light that is deflected at an angle greater than 5° counts as scattered light. Therefore, in order to determine the measurement for horizontal scattering $S_H$ (i.e., the horizontal scattering behavior), the measured BTDF is correspondingly integrated. The measurement for the vertical scattering $S_V$ (i.e., the vertical scattering behavior) is determined analogously. The lower limit of integration, i.e., the angle after which light is considered to be scattered, should be selected greater than the customary 1.8° of the haze measurement, since the BTDF measurement can be performed with a laser beam which typically has a divergence of 4°.

The integrals for determining the measurements of $S_H$ and $S_V$ are indicated in the following:

$$S_H = \int_{-90°}^{-5} BTDF(H, V = 0°; H_i = 0°, V_i = 0°)dH +$$

-continued
$$\int_{+5°}^{+90°} BTDF(H, V = 0°; H_i = 0°, V_i = 0°)dH$$

$$S_V = \int_{-90°}^{-5} BTDF(H = 0°, V; H_i = 0°, V_i = 0°)dV +$$

$$\int_{+5°}^{+90°} BTDF(H = 0°; V; H_i = 0°, V_i = 0°)dV$$

Here, H is the angle in horizontal direction, V is the angle in vertical direction under which the transmission is measured, and $H_i$ and Vi are, respectively, the angles under which a light beam is incident on the object to be measured (in this case 0°, respectively). Therefore, the anisotropy of the scattering behavior $S_V/S_H$ required according to the invention can be formulated as follows: $S_V/S_H \neq 1$ or, for common cases of application, $S_V/S_H > 1$.

Table 1, following, shows exemplary values for the normalized scattering $S_H$ and $S_V$ (i.e., for the scattering behavior) for different measurement points P1 to P5 on the plate-shaped light guide:

TABLE 1

Exemplary normalized values for scattering $S_H$ and $S_V$

| | Scattering $S_H$ | Scattering $S_V$ | Anisotropy $S_V/S_H$ |
|---|---|---|---|
| P1 | 0.037 | 0.139 | 3.757 |
| P2 | 0.030 | 0.210 | 7.000 |
| P3 | 0.054 | 0.372 | 6.889 |
| P5 | 0.066 | 0.490 | 7.424 |
| P4 | 0.083 | 0.598 | 7.205 |

The anisotropy SV/SH indicates how much stronger the scattering behavior is along the vertical direction. As has been described above, scattering is taken to mean a deflection greater than 5°. The anisotropic scattering behavior in this example is obvious.

The outcoupling elements can be distributed in or on the light guide in various ways in principle during the production of the light guide in accordance with adaptable and pre-determinable conditions for the outcoupling of light. The outcoupling elements are localized structural changes in the volume of, and/or on the surfaces of, the light guide. Therefore, the term "outcoupling element" expressly excludes additional optical layers which are applied to the surfaces of the light guide, such as diffusion layers, reflective layers, (dual) brightness-enhancing, collimating layers (brightness enhancement film—BEF) or polarization-recycling layers, such as polarization-selective Bragg mirrors ([dual] brightness enhancement film—(D)BEF) or wire grating polarizers. These additional layers which are not covered under the term "outcoupling elements" are connected to the light guide, if at all, only at the edges but mostly rest thereon only loosely in the region of the large surfaces and do not form a physical unit with the light guide. In contrast, coatings which are applied to the large surfaces and bond with the light guide through chemical reactions or other forces (e.g., van der Waals forces) form a physical unit and are inseparable from one another. Therefore, such coatings are not considered to be additional layers in the above-defined sense.

As has been described above, the structure of the outcoupling elements is prescribed by the above-mentioned criteria; the action of each outcoupling element is known at least approximately, and characteristics of the light guide or of the light exiting from the light guide, respectively, can be appointed selectively by means of a pre-determinable structure and distribution of the outcoupling elements. This is a matter particularly of the ratio of the sum of the areas of the function surfaces to the area of the total surface area of the large surface from which light is coupled out.

The characteristics which are required of the outcoupling elements, and which are key to the invention, as concerns their quantity per unit area, their shape, their orientation and extent in three dimensions and their distribution over at least one of the large surfaces and/or within the volume of the light guide can be determined, for example, with optics simulation software, such as "LightTools" available from the firm Synopsis or other suppliers, and can then be physically implemented in a corresponding manner.

The distribution of the outcoupling elements on at least one of the large surfaces of, and/or within the volume of, the light guide is advantageously specified in such a way that the out-coupled light reaches a luminance uniformity of 70% on at least 70% of the surface of the light guide. The luminance uniformity can be defined as $L_V^{min}/L_V^{max}$, i.e., as the ratio of the smallest luminance value to the largest luminance value of a surface. Another applicable rule for measuring the luminance uniformity is defined in the "Uniformity Measurement Standard for Displays V1.3" by the German Automotive OEM Work Group Displays.

The two operating modes B1 and B2 are ultimately distinguished from one another in that the backlight is switched on and the illuminants (at the narrow sides of the light guide) are switched off in operating mode B2, and at least the illuminants (at the narrow sides of the light guide) are switched on in operating mode B1. In this way, only light which was originally radiated from the illuminants into the light guide and subsequently emitted again from the latter via the outcoupling elements is taken into consideration, the emission being effected virtually exclusively via the outcoupling elements.

It is possible to apply outcoupling elements on both large surfaces and/or additionally optionally within the volume.

The light guide preferably comprises a transparent, thermoplastic or thermoelastic polymer, e.g., plastic, or glass. For example, the light guide or its substrate can comprise at least 40 percent by weight of polymethyl methacrylate, preferably at least 60 percent by weight of polymethyl methacrylate. Alternatively, a polycarbonate (PC) can be used, for example.

Further, it is advantageous for some applications that the aforementioned limited angular range is formed asymmetrically relative to the surface normal of the backlight. The asymmetry is preferably carried out in one of the preferential directions. This is helpful particularly in motor vehicle applications, such as when a display screen to be combined with the illumination device according to the invention is arranged in the dashboard about midway between the driver and the front seat passenger as a center information display. In this case, the limited angular viewing range accessible exclusively by the passenger must be configured asymmetrically, i.e., directed toward the passenger. In this instance, the preferential direction in which the asymmetry is formed corresponds to the horizontal.

The outcoupling elements for coupling out light on at least one of the large surfaces of the light guide preferably comprise microlenses and/or microprisms and/or diffractive structures and/or three-dimensional structure elements and/or scattering elements, with their greatest dimension having a maximum extent of less than 100 micrometers, preferably less than 50 micrometers. In the case of diffractive structures, this can be, for example, a hologram or a grating/diffraction grating.

However, the outcoupling elements themselves can also have merely the outward form of microlenses, microprisms, scattering elements and/or diffractive structures. In this case, they can be configured particularly as cavities which are then formed in the volume of the light guide. These may be voids but are preferably filled with a gaseous, liquid or solid material. The material has a refractive index that diverges from, and is preferably lower than, that of the material used for the light guide. The conduction and coupling out of light can be influenced by the filling and choice of material. Alternatively or additionally, the haze value of the material preferably also diverges from, and is preferably higher than, that of the material used for the light guide. These embodiments have the advantage of a more efficient outcoupling of light.

Alternatively and in a simpler manner in technical respects, the cavities can also be formed when the light guide is formed from two substrate layers which are connected to one another, these substrate layers preferably being identical. The connection can be carried out chemically, physically or by gluing. The cavities are then formed as material cutouts on at least one of the boundary surfaces of the substrate layers.

When the outcoupling elements are provided on at least one of the large surfaces of the light guide, it is advantageous when these outcoupling elements are formed from a plastic having structures that are formed by a tool or from glass having a structure that is embossed by a tool. This is possible, e.g., in mass production, in that a UV-curable material, e.g., a paint, a monomer, etc., having tooled structure is applied to a light guide substrate and is hardened, e.g., polymerized, by means of UV radiation. Other radiation-curable materials may also be used. The cutouts for implementing the outcoupling elements may be formed mechanically, by means of lithography or printing or by material deposition, material transformation, material removal or material dissolution, for example.

Accordingly, for example, grating structures, microprisms—either convex with plastic portion facing outward on the surface and/or concave as embossment or cutout within the surface layer of the structured plastic—other three-dimensional structure elements in other shapes, or microlenses can be realized in a cost-effective manner and so as to be suitable for mass production. Concave or convex structures may be utilized indifferently.

The backlight comprises, for example, an area emitter, preferably a further light guide with further illuminants arranged laterally or on the rear surface and at least one light collimator which is integrated in and/or arranged in front of the area emitter, such as at least one prism film and/or at least one privacy filter (microlouver filter). Further, a so-called focused backlight unit may be used as backlight with which light is coupled out of a (different) light guide already in a limited angular range and is possibly additionally directed, deflected or shaped.

Accordingly, in a corresponding manner, the backlight may be constructed in principle as an LED backlight, for example, a direct lit LED backlight, edge LED backlight, OLED or other area emitter on which, e.g., at least one permanent privacy filter (with microlouvers) is applied.

For all of the variants of the illumination device described above, it is particularly advantageous that they further comprise as display screen a transmissive display screen arranged in front of the illumination device in viewing direction, preferably in the form of an LCD panel which can be operated because of the illumination device in at least two operating modes, B1 for an open viewing mode and B2 for a restricted viewing mode.

In some cases, it may also be helpful when the display screen also has an anisotropic scattering behavior for light which penetrates the display screen through its large surfaces. The preferential direction in which the scattering behavior of the display screen is stronger should then correspond to the preferential direction which also has the stronger scattering behavior in the light guide. This is frequently the vertical direction. Moreover, it is possible that anisotropically scattering layers are arranged between the display screen and the light guide, for example, to hide optical artifacts on the light guide with the least possible influence, if any, on the protected viewing effect. Anisotropically scattering layers are known in the art such as, for example, holographic diffusers or binary (computer-generated) holograms.

Means for reducing or controlling reflections, for example, an antireflective coating, can be arranged on the upper surface of the display screen and/or on at least one of the large surfaces of the light guide and on at least one of the privacy filters, if any.

In a further embodiment of the illumination device which is expanded by a display screen, a further light guide (e.g., of glass or plastic) is arranged in front of the display screen in viewing direction and has means for coupling out light and can be supplied with light laterally by illuminants. The means for outcoupling which are utilized in this case are, for example, those means described above or those known from the art such as nanoparticles like titanium dioxide, barium sulfate, etc. in suitable sizes and quantities as described, for example, in WO 2015/121398 A1 and WO 2017/089482 A1 which are uniformly distributed in the volume of the light guide. With this embodiment, any residual light which might unintentionally still be present in operating mode B2 in the angular ranges which are actually protected from viewing can be overlaid or over-radiated in such a way that any contrast is now imperceptible and, accordingly, the corresponding illuminants for the further light guide are formed to emit colored light or white light. The illuminants can radiate light of a color that is or is not present in the image displayed by the transmissive display screen. It is no longer possible to perceive images from the restricted angles.

In a particularly advantageous manner, the illumination device according to the invention having a display screen is used in a vehicle for selectively displaying image contents only for the passenger in operating mode B2 or for both the driver and the passenger simultaneously in operating mode B1. The former case is helpful, for example, when the passenger is watching entertainment programming which could distract the driver.

An illumination device according to the invention having a display screen can likewise be used to input or display confidential data, for example, PIN numbers, e-mails, SMS or passwords, in automatic tellers, payment terminals or mobile devices.

In all of the embodiments mentioned above, the aforementioned illuminants can be LEDs or LED arrays or laser diodes. Other variants are contemplated and lie within the scope of the invention.

Further, the selected limited angular ranges for mode B2 can be defined and implemented independent from one another for a restricted view for the horizontal direction and for the vertical direction. For example, an angle (or possibly no limitation at all) which is larger in the vertical direction than in the horizontal direction could be practical, such as when persons of different sizes are to view an image at automatic teller machines, while viewing from the side should remain highly or completely restricted. For POS payment terminals, on the other hand, safety rules often dictate viewing restrictions in mode B2 in both the horizontal direction and vertical direction.

The performance of the invention remains consistent in principle when the above-described parameters are varied within certain limits.

It will be understood that the features mentioned above and those yet to be explained below may be used not only in the stated combinations but also in other combinations or alone without departing from the scope of the present invention.

BRIEF DESCRIPTION OF THE DRAWINGS

The invention will be explained in more detail in the following with reference to drawings which also disclose key features of the invention. These embodiment examples are provided merely to be illustrative and should not be considered as restrictive. For example, a description of an embodiment example having a plurality of elements or components should not be interpreted to mean that all of these elements or components are necessary for its implementation. On the contrary, other embodiment examples may also contain alternative elements and components, fewer elements or components, or additional elements or components. Elements or components of different embodiment examples can be combined with one another unless otherwise stated. Modifications and alterations which are described for one of the embodiment examples may also be applicable to other embodiment examples. Like or comparable elements in the various figures are designated by the same reference numerals and not mentioned repeatedly so as to prevent repetition. The drawings show.

DETAILED DESCRIPTION OF THE DRAWINGS

Figure 1:
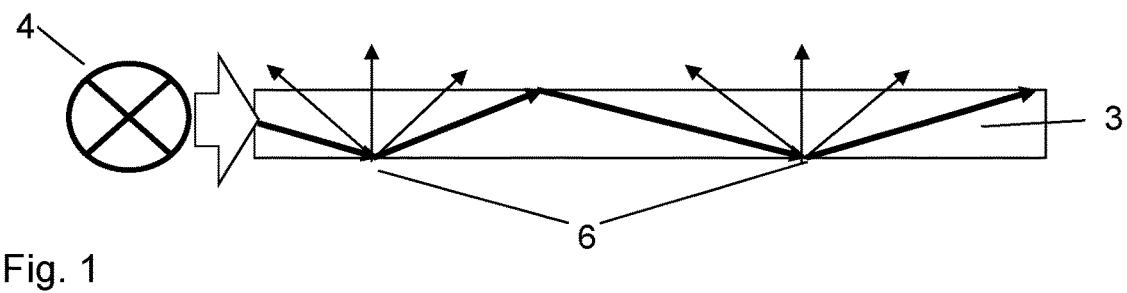
FIG. 1 a schematic diagram showing light that is laterally coupled into a light guide being coupled out from the lower large surface of the light guide on which the outcoupling elements are located, wherein the light exits the light guide at the upper large surface.

FIG. 1 is a schematic diagram showing light that is laterally coupled into a light guide 3 from illuminants 4 being coupled out on the lower large surface of the light guide 3 on which the outcoupling elements 6 are located. However, the coupled out light exits the light guide 3 predominantly, i.e., by more than 50%, at the upper large surface. In horizontal direction—which in this instance lies in the drawing plane and extends from right to left, whereas the vertical direction faces into the page—the light is coupled out of the upper large surface of the light guide 3 in a wide angle (greater than 60°). The location of the outcoupling elements 6 is indicated by numeral 6, but the actual outcoupling elements 6 are not shown here because they are of microscopic size. Accordingly, light from the illuminants 4, e.g., from LEDs, is laterally coupled into the light guide 3. Because of total internal reflection, rays of the coupled-in light (rays shown in bold) are thrown back again into the light guide 3 at the outer wall until they finally (possibly after numerous times) impinge on an outcoupling element 6 for the required outcoupling. The outcoupling is shown schematically by the thin rays. The diagram in FIG. 1 is highly schematic for better clarity. In reality, a very large number of ray paths are realized in the light guide 3. Further, light refractions at refractive transition surfaces are not taken into account.

Figure 2:
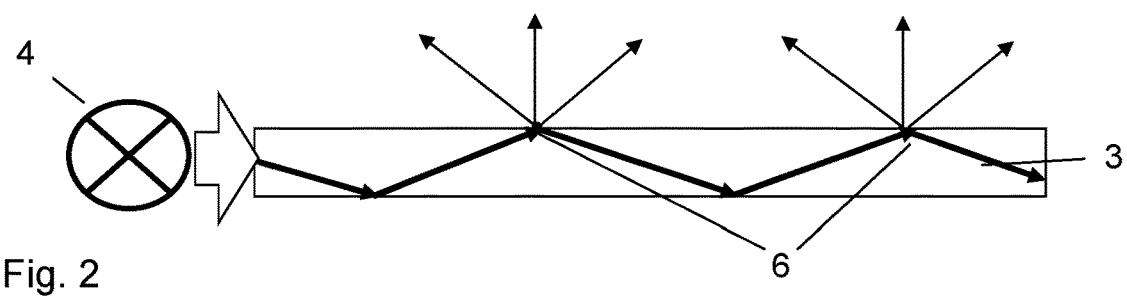
FIG. 2 a schematic diagram showing light that is laterally coupled into a light guide being coupled out from the upper large surface of the light guide on which the outcoupling elements are located, wherein the light exits the light guide at the upper large surface.

FIG. 2 shows a schematic diagram illustrating light which is laterally coupled into a light guide 3 by illuminants 4 being coupled out of the upper large surface of the light guide 3 on which the outcoupling elements 6 are located. In this instance also, the light exits the light guide 3 predominantly through the upper large surface. The remarks referring to FIG. 1 apply here in an analogous manner. The difference in technical respects consists merely in the position and possibly the configuration of the outcoupling elements 6 which now lie on the upper side of the light guide 3 and which therefore now couple out the light directly upward. In contrast to the conditions illustrated in FIG. 1, the out-coupled light need not pass once again through the light guide 3.

Figure 3:
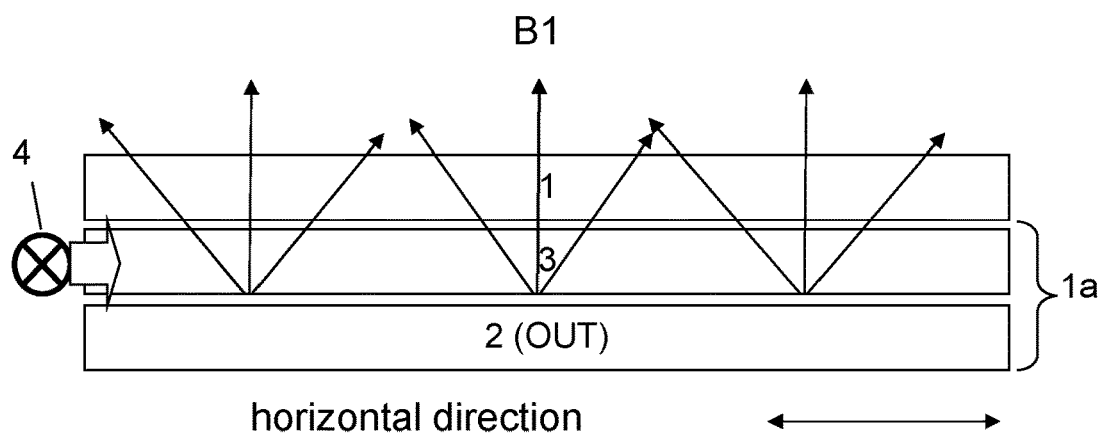
FIG. 3 a schematic diagram showing the illumination device in a first embodiment in combination with a display screen in mode B1 for an unrestricted viewing mode.
Figure 4:
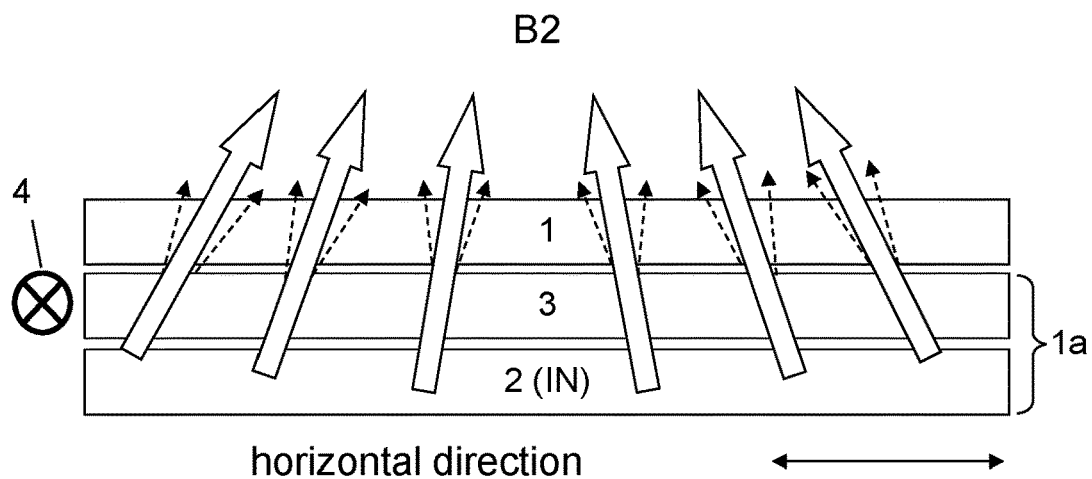
FIG. 4 a schematic diagram showing the illumination device in a first embodiment in combination with a display screen in mode B2 for a restricted viewing mode.

FIG. 3 and FIG. 4 show an illumination device 1a which can be operated in at least two operating modes, B1 for an open viewing mode and B2 for a restricted viewing mode in which light from the illumination device is emitted in an angular range that is limited in comparison with the open viewing mode. The illumination device 1a comprises a two-dimensionally extending backlight 2 which radiates light in the limited angular range and a plate-shaped light guide 3 with two large surfaces and narrow sides joining the large surfaces at the edges thereof, this plate-shaped light guide 3 being located in front of the backlight 2 in viewing direction. The light guide 3 has outcoupling elements 6 on at least one of the large surfaces and/or within its volume and is at least 50%, preferably at least 70%, transparent to the light emanating from the backlight 2. Illuminants are arranged laterally of the narrow sides of the light guide, including illuminants arranged only at one side of the light guide. In operating mode B2, the backlight is switched on and the illuminants are switched off, whereas in operating mode B1 at least the illuminants are switched on.

The shape, quantity per surface area, the orientation and/or the extent of the outcoupling elements 6 are/is selected in such a way that, by means of the outcoupling elements 6 or at least a proportion thereof, the light guide 3 exhibits an anisotropic scattering behavior for light which penetrates the light guide 3 through the large surfaces thereof.

In concrete terms, this means that every outcoupling element 6 has at least one function surface 5 for coupling out light in a defined manner, light being coupled out of the light guide at the function surface 5 in a corresponding manner. In the simplest case, these function surfaces 5 are planar or at least have planar surface portions, but they may also be surfaces which are curved in one or two linearly independent directions. An orientation vector is now defined for the function surfaces 5, this orientation vector being parallel to the large surface at which the light exits, i.e., in a plane parallel to the aforementioned large surface. This orientation vector is a vector which maximizes the integral of the scalar product of this vector with a spatially dependent normal vector of the function surface 5 over the function surface 5. For planar surfaces, of course, the normal vector is constant at every point on the function surface 5 but varies for curved surfaces in case of the normal vector of a tangential plane at the respective point. Specifically, the orientation vector $\vec{v}$ maximizes the integral $\int_A \vec{n} \cdot \vec{v}\, dA$, where $\vec{n}$ is the spatially dependent normal vector of the function surface 5, designated here by A, in coordinates x and y. This orientation vector forms an angle of up to 45° with a given preferential direction. The normal vector forms an angle of between a minimum of 5° and a maximum of 85° with the respective large surface from which the light exits, but, preferably, the lower limit value is 30° and/or the upper limit value is 60°. The calculated orientation vector is a measurement for the twisting of the function surface 5 of the outcoupling element 6 relative to the preferential direction but need not necessarily correspond to the "average" of all possible surface normals present on the function surface 5 or the projection of the surface normals on one of the large surfaces of the light guide 3.

When the outcoupling elements 6 are configured in this way, the light guide 3 has a scattering behavior which is stronger by at least a factor of 1.2, preferably even at least by a factor of 2 or 3, in the preferential direction than in a direction perpendicular to the preferential direction and therefore, overall, has an anisotropic scattering behavior for light penetrating the light guide 3 through both large surfaces thereof.

The large surface from which light exits can also be divided into subregions of a given magnitude, the ratio of the surface areas of the function surfaces in a subregion to the surface area of the respective subregion being different for different subregions such that the scattering behavior of the light guide 3 varies over the large surface from which the light exits.

FIG. 3 shows a schematic diagram of an illumination device 1a of this type in a first embodiment in combination with a display screen 1 in mode B1 for an open viewing mode. Any angular range that is smaller than the half space in front of the backlight can be contemplated as limited angular range in principle; however, what is preferably meant in this instance is, for example, an angular range of +/−20° or 30° horizontally and/or vertically or as a cone around the surface normal or a selectable direction vector on the backlight 2, respectively. Small amounts of light of less than 1% to 5% maximum brightness need not be taken into account in the definition of the limited angular range.

The schematic diagrams in FIGS. 3 and 4 are sectional views.

FIG. 4, on the other hand, is a schematic diagram showing the illumination device in a first embodiment in combination with a display screen in mode B2 for a restricted viewing mode. The large arrows indicate the light in the limited angular range, while the thin arrows in dashed lines schematically show that only very little light is scattered horizontally compared to the light from the backlight 2. The scattering behavior of the outcoupling elements 6 on the light guide 3 which is consequently anisotropic and which is stronger in vertical direction than in horizontal direction will be explained in more detail referring to FIGS. 5A-5C.

In a preferred embodiment of the illumination device 1a, the light emitted from the backlight 2 at least in operating mode B2 is radiated in horizontal direction in a limited angular range so that the aforementioned light undergoes less scattering in horizontal direction than in vertical direction when passing through the light guide 3 as is indicated in FIG. 4. Accordingly, light which is emitted in the limited angular range is scattered only slightly outside of the aforementioned limited angular range.

The two operating modes B1 and B2 ultimately differ from one another in that the backlight 2 is switched on and the illuminants 4 (at the narrow sides or at one narrow side of the light guide 3) are switched off in operating mode B2 and at least the illuminants (at the narrow sides of the light guide) are switched on in operating mode B1. The illuminants 4 radiate light into the light guide 3. Subsequently, the outcoupling elements 6 couple the light out of the light guide 3, the emission being effected virtually exclusively via the outcoupling elements 6.

The backlight 2 comprises, for example, an area emitter, preferably a further light guide with further illuminants arranged laterally or on the rear side, and at least one light collimator which is integrated in the area emitter and/or arranged in front of the latter, such as at least one prism film and/or at least one privacy filter (e.g., a microlouver filter).

Accordingly, in a corresponding manner, the backlight 2 may be constructed in principle as an LED backlight, for example, a direct lit LED backlight, edge lit LED backlight, OLED or other area emitter on which, e.g., at least one permanent privacy filter (e.g., with microlouvers) and/or another light collimator is applied or arranged.

The light guide 3 preferably comprises a transparent, thermoplastic or thermoelastic polymer, e.g., plastic, or glass. For example, the light guide 3 can comprise polycarbonate.

The aforementioned proportion of the outcoupling elements 6 advantageously comprises at least 30%, preferably at least 50%, particularly preferably more than 90%, of the outcoupling elements 6 which are then selected with respect to their shape, quantity per surface area, orientation and/or extent in such a way that they have an anisotropic scattering behavior for light which penetrates the light guide 3 through the large surfaces thereof. Alternatively or additionally, for all of the outcoupling elements on the average, the orientation vectors form an angle of up to 45° with the preferential direction. In particular, the light guide 3 can have a stronger scattering behavior in the preferential direction than in a direction perpendicular thereto.

The anisotropic scattering behavior of the outcoupling elements 6 is characterized based on the measurement of the scattering behavior with respect to at least two directions perpendicular to one another along which the scattering behavior is measured, a preferential direction and a direction perpendicular thereto. In this respect, that scattering behavior engendered when, for example, light passes perpendicularly through a light guide 3 because of the outcoupling elements 6 is to be taken into account particularly. However, reference directions other than the orthogonal to the light guide 3 can also be taken into account.

The terms "vertical" and "horizontal" refer broadly to a preferential direction and to a direction perpendicular thereto on the surface of the backlight or on a large surface of a light guide. Advantageously, the preferential direction corresponds to the vertical direction when the illumination device 1a is viewed by the observer and the direction perpendicular thereto corresponds to the vertical direction, and the scattering behavior of the outcoupling elements 6 is greater in vertical direction than in horizontal direction. As a rule, the horizontal direction also corresponds to the horizontal to the Earth's surface at least with display screens with such light guides as do not change their orientation in this respect. However, the horizontal direction is generally taken to mean that direction which extends parallel to a line connecting the eyes of an observer. In this regard, it is assumed that when the observer or this line moves, the position of the display screen being viewed, e.g., in mobile terminal devices, also changes. With respect to the coordinate system of a mobile display screen, it is ultimately an arbitrary decision as to which direction is horizontal and which direction is vertical; the two directions need only be orthogonal to one another.

Figure 5A:
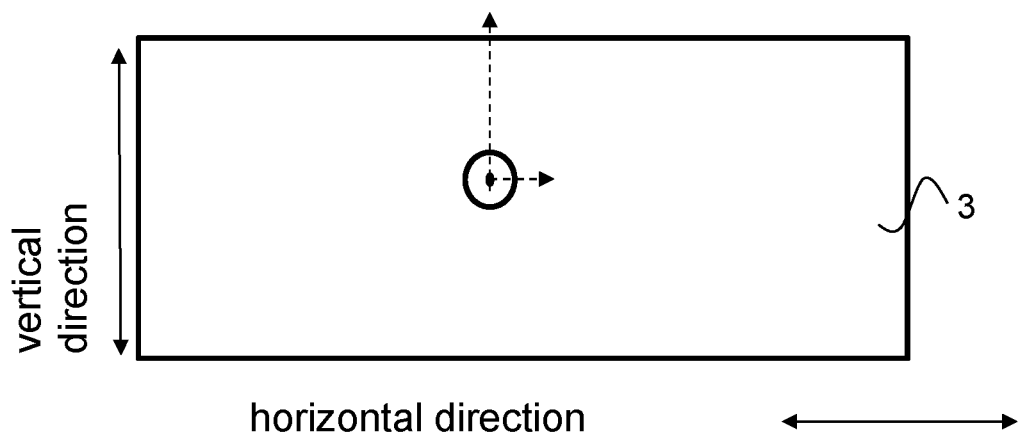
FIG. 5A a schematic top view of a light guide which is penetrated through its large surfaces by a ray of light for purposes of illustrating the anisotropic scattering behavior.

In this regard, FIG. 5A shows a schematic top view of a light guide 3 which is penetrated by a ray of light through its large surfaces to illustrate the anisotropic scattering behavior. The dot inside the circle symbolizes a ray of light that is incident on the light guide 3 perpendicularly from below, penetrates the light guide 3 from one large surface to the next large surface and, in doing so, also impinges on outcoupling elements 6, not shown. The short arrow in dashes in the horizontal direction compared to the longer arrow in dashes in the vertical direction is intended to indicate that the scattering behavior in horizontal direction is less than in vertical direction because of the anisotropic scattering behavior of the corresponding outcoupling elements 6.

Figure 5B:
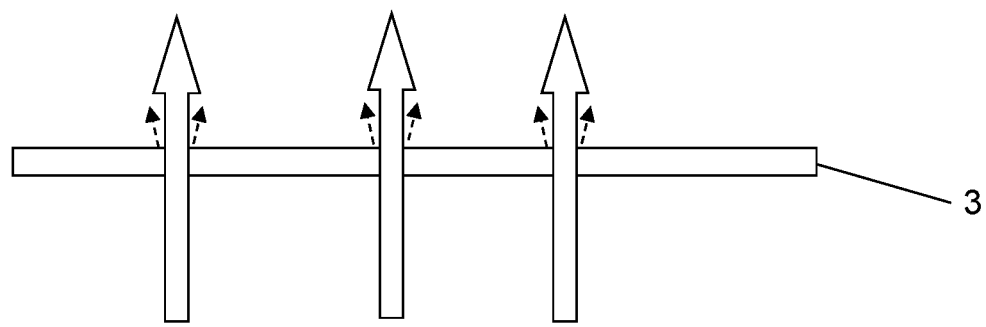
FIGS. 5B-5C sectional views through the light guide from FIG. 5A along two directions orthogonal to one another.
Figure 5C:
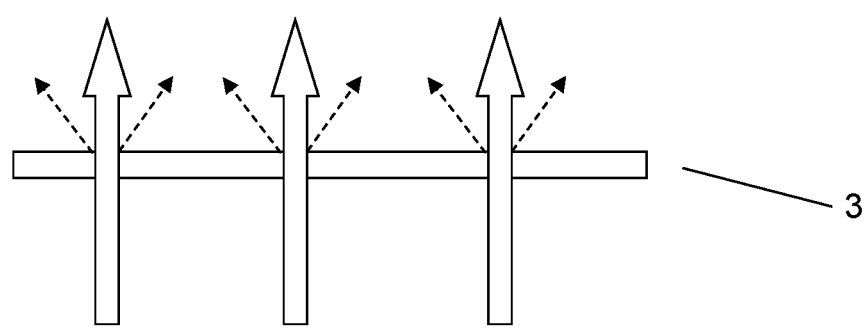

FIG. 5B shows a sectional view through the light guide 3 in direction perpendicular to the preferential direction, i.e., in this case, in horizontal direction. FIG. 5C, on the other hand, shows a sectional view through the light guide 3 in the preferential direction, i.e., in this case, in vertical direction. The outcoupling elements are not shown. Thick arrows symbolize the light penetrating the light guide 3 through both large surfaces—in this case, the upper side and underside—which is emitted by the backlight 2, not shown. The dashed arrows indicate the maximum scattering angle range which is perceptibly larger in the preferential direction in FIG. 5C than in the direction perpendicular thereto in FIG. 5B.

The outcoupling elements for coupling out light on at least one of the large surfaces of the light guide preferably comprise microlenses and/or microprisms and/or diffractive structures and/or three-dimensional structure elements and/or scattering elements, with their greatest dimension having a maximum extent of 100 micrometers, preferably 50 micrometers. In the case of diffractive structures, this can be, for example, a hologram or a grating/diffraction grating.

Figure 6A:
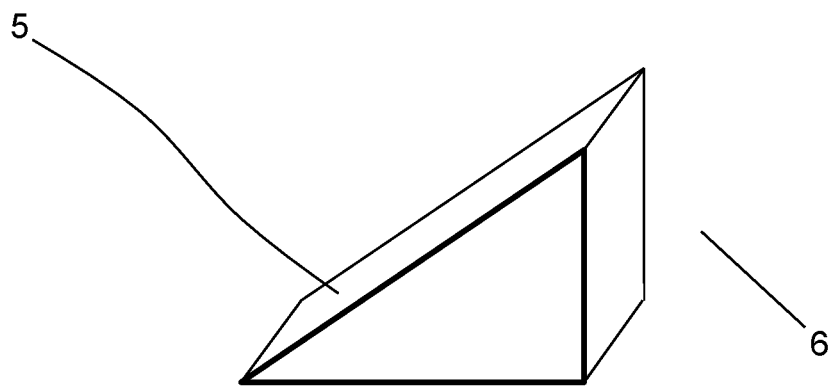
FIGS. 6A-6C schematic diagrams showing various embodiments of an outcoupling element.
Figure 6B:
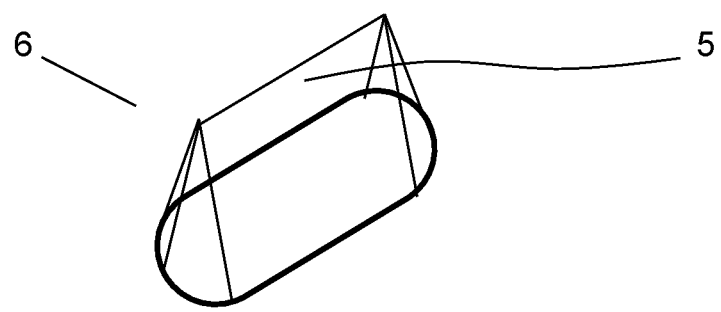
Figure 6C:
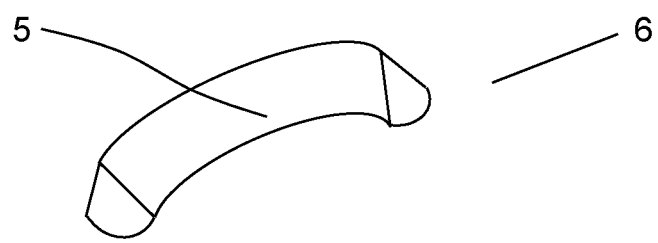

FIG. 6A shows a schematic diagram illustrating an exemplary form of an outcoupling element 6, in this case, in the form of a microprism. This type of outcoupling element may be distributed homogeneously or preferably inhomogeneously (such as—with some exceptions—with increasing distance from the illuminants 4 in larger quantities per surface area) on one or both large surfaces and/or in the volume of the light guide 3, e.g., as cutout filled with air. Of course, other forms of outcoupling elements 6 are possible and are shown in FIG. 6B and FIG. 6C. The function surface is, in each instance, the surface facing diagonally upward. The outcoupling element 6 shown in FIG. 6A has a simplified shape; generally, the function surface which is planar in this diagram is somewhat rounded at its upper and lower edges and can also have a curvature in its entire extent in one or two dimensions as is shown in FIG. 6B and FIG. 6C. The dimensions are typically between 1 µm and 100 µm in each spatial dimension, preferably between 2 µm and 40 µm, where the height—the vertical direction in the drawing plane—is preferably no greater than 20 µm.

Figure 7A:
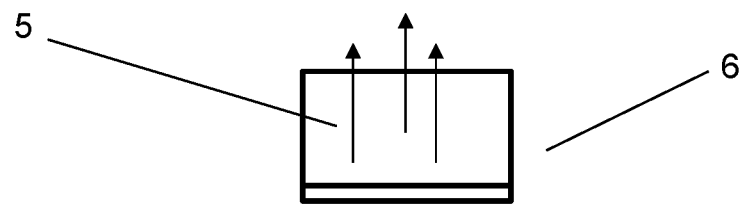
FIG. 7A a top view of an outcoupling element with ray path shown schematically.

FIG. 7A shows a top view of an outcoupling elements 6 as is shown by way of example in FIG. 6A and can be formed as a cutout, for example, at the light entrance surface, i.e., that large surface of the light guide in which the light emitted by the backlight enters. Rays of light—not shown here—impinge from below, i.e., from below the drawing plane perpendicular thereto on the light entrance surface. Because of the deflection at the function surface 5, the light is deflected by up to 45° in direction of the preferential direction—in this case, the vertical direction facing upward in the drawing plane. This is shown more clearly in FIG. 7B. The function surface 5 is ineffective perpendicular to the preferential direction, which is why the scattering effect is appreciably weaker in this direction.

Figure 7B:
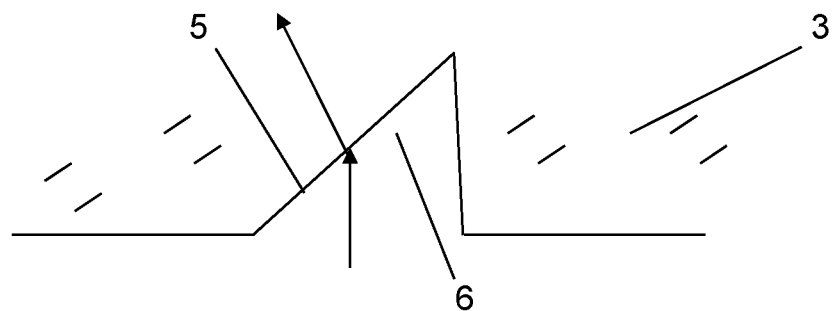
FIG. 7B a sectional view through the outcoupling element from FIG. 7A with indicated ray paths for light which penetrates the light guide and the outcoupling elements.

FIG. 7B shows a sectional view of the outcoupling element from FIG. 7A which is formed as material cutout in the light guide, whose material is characterized by a corresponding shading. Due to the function surface 5, the light in preferential direction—in this case, the horizontal direction in the drawing plane—is deflected by refraction and also scattering, indicated by the two arrows. The function surface 5 is ineffective perpendicular thereto, i.e., also perpendicular to the drawing plane; however, unwanted scattering components occur, in principle, perpendicular to the preferential direction due to residual effects of the three-dimensional extent of the outcoupling element.

Figure 7C:
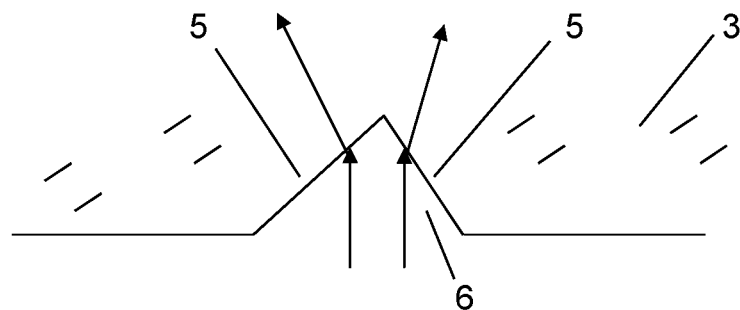
FIG. 7C a sectional view through another outcoupling element with indicated ray paths for light which penetrates the light guide and the outcoupling elements.

Lastly, FIG. 7C shows the sectional view of another outcoupling element which has two function surfaces 5 in contrast to the outcoupling element in FIG. 7B. This outcoupling element 6 is also formed as a cutout in the material in an analogous manner. The effect of the function surfaces 5 corresponds to those in FIG. 7B.

It is particularly advantageous for all of the above-described variants of the illumination device 1a that they further comprise, as display screen 1, a transmissive imaging means arranged in front of the illumination device 1a in viewing direction, preferably in the form of an LCD panel, which can be operated in at least two operating modes, B1 for an open viewing mode and B2 for a restricted viewing mode, because of the illumination device 1a.

In some cases, it may also be helpful when the display screen 1 also has an anisotropic scattering behavior for light which penetrates the display screen 1 through its large surfaces. The preferential direction in which the scattering behavior of the display screen 1 is weaker should then correspond to that preferential direction which also has the weaker scattering behavior in the light guide. This is often the horizontal direction.

Means for reducing or controlling reflections, for example, an anti-glare coating and/or an anti-reflection coating, can be arranged on the upper surface of the display screen 1 and/or on at least one of the large surfaces of the light guide 3 as well as on at least one of the privacy filters, if any.

In all of the embodiments mentioned above, the aforementioned illuminants 4 can be LEDs or LED arrays or laser diodes. Other variants are contemplated and lie within the scope of the invention.

The above-described illumination device according to the invention and the display screen which can be implemented therewith meet the stated object and allow very practical solutions for securely displaying information by means of a selective restricted viewing angle, while enabling open viewing with an unrestricted viewing angle in a further operating mode. The invention is realizable economically with simple means. The native resolution of the utilized display screen is usable in both operating modes. Further, there is only a slight light loss brought about by the solution, and the restricted viewing angle achieves the most comprehensive possible protected view effect.

The above-described invention can advantageously be applied anywhere that confidential data are displayed and/or entered, such as pin number entry or data display in money dispensing machines or payment terminals or for entering passwords or when reading e-mails on mobile devices. The invention can also be applied in passenger vehicles, as has been described above.

REFERENCE CHARACTERS 1 display screen
1a illumination device
2 backlight
3 light guide
4 illuminant
5 function surface
6 outcoupling element

The invention claimed is:

1. An illumination device for a display screen, which illumination device can be operated in at least two operating modes, B1 for an open viewing mode and B2 for a restricted viewing mode in which light is emitted by the illumination device in an angular range which is limited compared with the open viewing mode, the illumination device comprising
   a two-dimensionally extending backlight which emits light in the limited angular range,
   a plate-shaped light guide with two large surfaces and narrow sides connecting the large surfaces at edges thereof which is located in front of the backlight in a viewing direction, wherein the light guide has outcoupling elements on at least one of the large surfaces and/or within a volume of the light guide, wherein the light guide is at least 50% transparent to light emanating from the backlight, wherein every outcoupling element has at least one function surface for coupling out light in a manner defining the way in which light is coupled out of the light guide,
   illuminants arranged laterally of the narrow sides of the light guide,
   wherein the backlight is switched on and the illuminants are switched off in operating mode B2, and wherein at least the illuminants are switched on in operating mode B1, and
   wherein for at least a proportion of the outcoupling elements, an orientation vector of each one of the function surfaces which is parallel to the large surface at which the light exits forms an angle of up to 45° with a preferential direction, wherein the orientation vector is a vector which maximizes an integral of a scalar product of this vector with a spatially-dependent normal vector of the function surface over the function surface, and wherein each normal vector forms an angle of between 5° and 85° with the respective large surface, such that the light guide has a scattering behavior in the preferential direction that is stronger by a factor of at least 1.2 than in a direction perpendicular to the preferential direction and, therefore, has an anisotropic scattering behavior overall for light which penetrates the light guide through both large surfaces.

2. The illumination device according to claim 1, wherein the proportion of outcoupling elements comprises at least 30% of all of the outcoupling elements and/or for all of the outcoupling elements on the average, the orientation vectors form an angle of up to 45° with the preferential direction.

3. The illumination device according to claim 1, wherein the light guide has a stronger scattering behavior in the preferential direction than in the opposite direction.

4. The illumination device according to claim 3, wherein the preferential direction considered from a perspective of the observer viewing the illumination device corresponds to a vertical direction, so that the scattering behavior of the light guide is greater in the vertical direction than in a horizontal direction, wherein the horizontal direction is parallel to a line between eyes of the observer.

5. The illumination device according to claim 1, wherein a ratio of areas of the function surfaces of the proportion of outcoupling element to an area of a large surface is determined in such a way that the scattering behavior of the outcoupling elements is greater in the preferential direction than in the direction perpendicular to the preferential direction by a factor of at least 2.

6. The illumination device according claim 1, wherein the large surface from which the light exits is divided into subregions of predetermined size, and a ratio of areas of function surfaces in a subregion to an area of the respective subregion varies for different subregions so that the scattering behavior of the light guide varies over the large surface from which the light exits.

* * * * *

UNITED STATES PATENT AND TRADEMARK OFFICE
CERTIFICATE OF CORRECTION

| | |
|---|---|
| PATENT NO. | : 12,287,506 B2 |
| APPLICATION NO. | : 18/553521 |
| DATED | : April 29, 2025 |
| INVENTOR(S) | : Heber et al. |

Page 1 of 1

It is certified that error appears in the above-identified patent and that said Letters Patent is hereby corrected as shown below:

In the Specification

In Column 5, Line 30, delete "200" and insert -- 20° --, therefor.

In Column 6, Line 13, delete "Vi" and insert -- $V_i$ --, therefor.

In Column 6, Line 34, delete "SV/SH" and insert -- $S_V/S_H$ --, therefor.

In the Claims

In Column 18, Claim 6, Line 13, delete "according" and insert -- according to --, therefor.

Signed and Sealed this
Twenty-second Day of July, 2025

Coke Morgan Stewart
*Acting Director of the United States Patent and Trademark Office*